(12) United States Patent
Nakamura et al.

(10) Patent No.: US 8,552,641 B2
(45) Date of Patent: Oct. 8, 2013

(54) DISPLAY PANEL, DISPLAY PANEL MODULE AND ELECTRONIC APPARATUS

(75) Inventors: Kazuo Nakamura, Kanagawa (JP); Hiroshi Sagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 673 days.

(21) Appl. No.: 12/230,124

(22) Filed: Aug. 25, 2008

(65) Prior Publication Data

US 2009/0066871 A1 Mar. 12, 2009

(30) Foreign Application Priority Data

Sep. 12, 2007 (JP) .................................. 2007-237271

(51) Int. Cl.
*H01J 1/62* (2006.01)
(52) U.S. Cl.
USPC .......................................... 313/512; 313/504
(58) Field of Classification Search
USPC ............................................... 313/512, 504
See application file for complete search history.

(56) References Cited

U.S. PATENT DOCUMENTS

| | | | | |
|---|---|---|---|---|
| 7,142,273 | B1* | 11/2006 | Zhang et al. | 349/139 |
| 2005/0189878 | A1* | 9/2005 | Shitagami et al. | 313/512 |
| 2006/0158111 | A1* | 7/2006 | Hayashi | 313/512 |
| 2007/0146598 | A1* | 6/2007 | Yokokawa et al. | 349/123 |

FOREIGN PATENT DOCUMENTS

| | | |
|---|---|---|
| JP | 2004-004988 A | 1/2004 |
| JP | 2007-194040 A | 8/2007 |
| JP | 2007-212817 A | 8/2007 |

OTHER PUBLICATIONS

Japanese Office Action issued Aug. 11, 2009 for corresponding Japanese Application No. 2007-237271.

* cited by examiner

*Primary Examiner* — Anh Mai
*Assistant Examiner* — Andrew Coughlin
(74) *Attorney, Agent, or Firm* — Rader, Fishman & Grauer PLLC

(57) ABSTRACT

A display panel is disclosed which suppresses appearance of structural fault at a frame portion of an opposing glass plate. The display panel has a panel structure ready for an active matrix driving method and includes an element having a formation face on which pixel circuits are formed, and an opposing substrate configured to seal the formation face. The opposing substrate has a protrusion pattern formed in a region thereof opposing to an outer edge of the opposing substrate. The protrusion pattern has a layer structure similar to that in a display region of the formation face.

7 Claims, 13 Drawing Sheets

DISPLAY PANEL, DISPLAY PANEL MODULE AND ELECTRONIC APPARATUS

CROSS REFERENCES TO RELATED APPLICATIONS

The present invention contains subject matter related to Japanese Patent Application JP 2007-237271, filed in the Japan Patent Office on Sep. 12, 2007, the entire contents of which being incorporated herein by reference.

BACKGROUND OF THE INVENTION

1. Field of the Invention

This invention relates to a panel structure of a display panel of the active matrix driving type, and particularly to a display panel, a display panel module and an electronic apparatus.

2. Description of the Related Art

At present, in the field of flat panel display (FPD) apparatus, a liquid crystal display apparatus (LCD) is the main current. However, the liquid crystal display apparatus which is not a self-luminous device requires a backlight, a polarizing plate and other members. Therefore, the liquid crystal display apparatus is disadvantageous in that it has a comparatively large thickness and is not necessarily sufficient in luminance.

On the other hand, an organic EL (electroluminescence) display apparatus which is one of self-luminous apparatus does not require a backlight or other members in principle. Therefore, it is considered that the organic EL display apparatus is more advantageous than the liquid crystal display apparatus in terms of reduction in thickness and assurance of high luminance.

Particularly in an organic EL display apparatus of the active matrix type wherein a switching element is formed for each pixel, the current consumption can be suppressed low by causing each pixel to hold light emission. Therefore, with an organic EL display apparatus of the type described, it is comparatively easy to achieve a large screen and high definition. From those reasons, the attention to the organic EL display apparatus is increasing in recent years.

Figure 1:
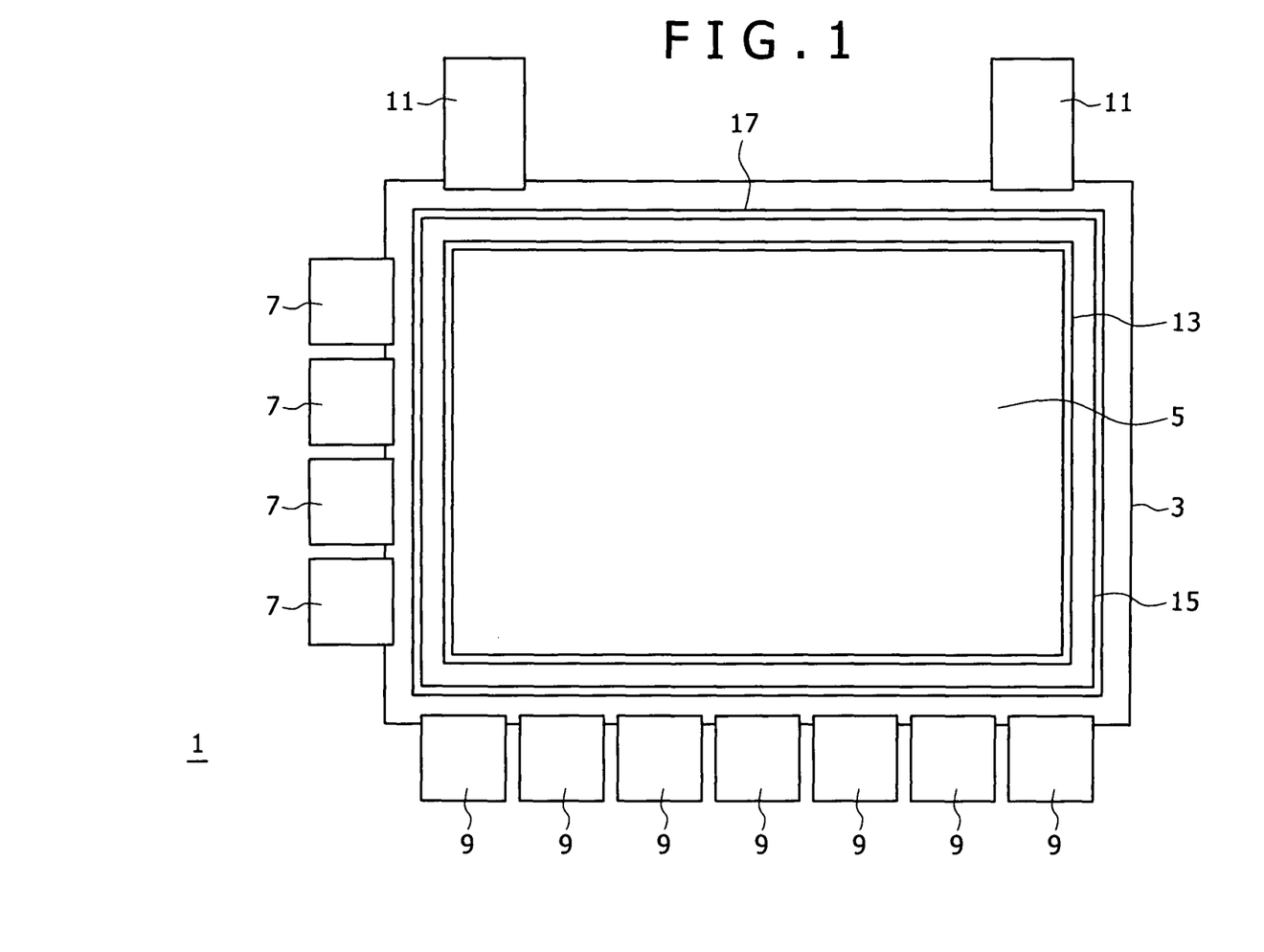
FIG. 1 is a schematic view showing an example of a configuration of a conventional organic EL panel module.

FIG. 1 shows an example of a configuration in plan of an organic EL panel module. Referring to FIG. 1, the organic EL panel module 1 shown includes a glass substrate 3 having a display region 5 on which a plurality of pixel circuits ready for active driving are arranged in a matrix.

Scanning signal supply TABs 7, image signal supply TABs 9 and power supply TCPs 11 serving as leads are connected to different sides of an outer periphery of the display region 5. The wiring lines mentioned are connected to N pixel control lines, M image signal lines and so forth in the display region 5 through connection pads.

An organic film 13 is formed wider by approximately 1 to 2 mm than the outer edge of the display region 5. Further, a cathode film 15 is formed on the outer side of the organic film 13. An opposing glass plate 17 is mounted in such a positional relationship as seen in FIG. 1 after a sealing material not shown is applied.

Figure 2:
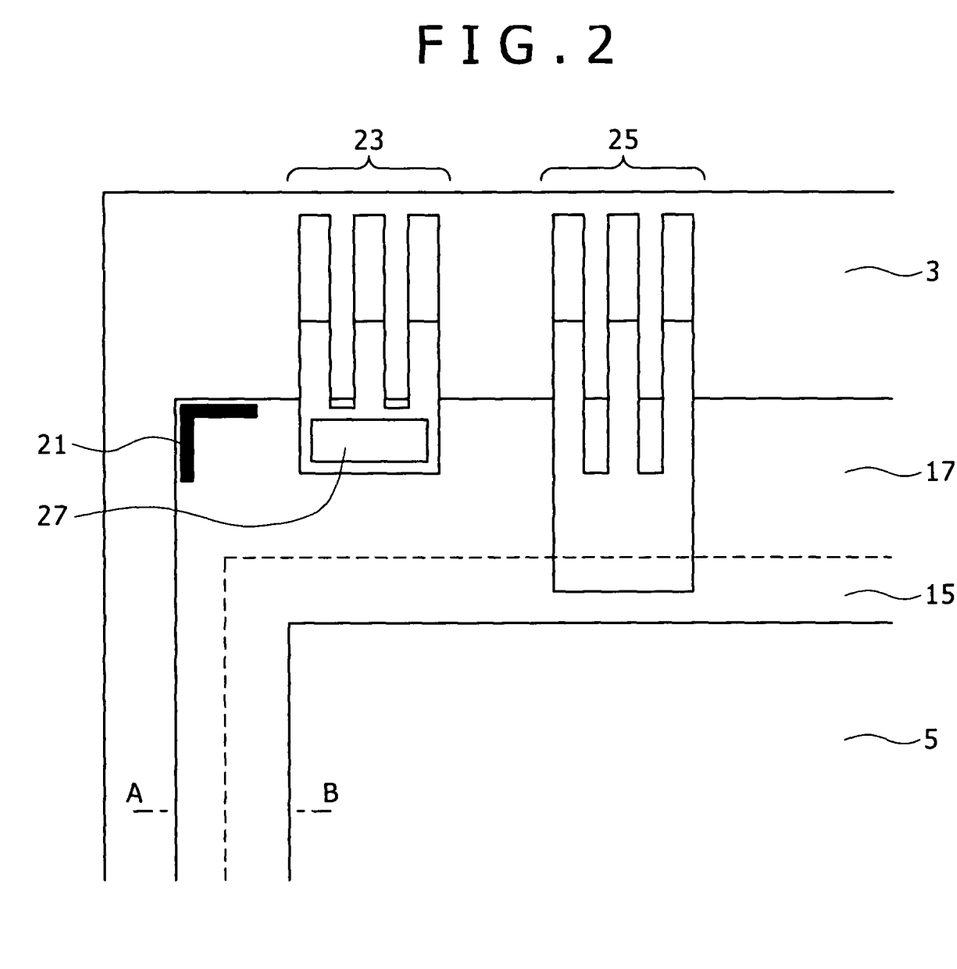
FIG. 2 is an enlarged view of a portion in the proximity of a frame of a glass substrate used in the conventional organic EL panel module of FIG. 1.

FIG. 2 shows an enlarged plan view of the organic EL panel module 1 in the proximity of a frame of the glass substrate 3 and particularly shows a corner portion of the glass substrate 3 including a portion in the proximity of an outer edge of the opposing glass plate 17. A positioning mark 21 is used for relative positioning of the glass substrate 3 and the opposing glass plate 17. The opposing glass plate 17 can be mounted at a predetermined position of the glass substrate 3 by the use of the positioning mark 21.

A cathode power supply pad 23 and an anode power supply pad 25 correspond to the power supply TCPs 11. The cathode power supply pad 23 is used for supply of cathode power. The cathode power supply pad 23 is connected to a cathode common electrode through a contact portion 27.

The cathode common electrode is electrically connected to the cathode film 15 at an outer peripheral portion of the display region 5.

Meanwhile, the anode power supply pad 25 is used for supply of anode power. The anode power supply pad 25 is connected to the pixel circuits in the display region 5 through metal wiring lines formed on a lower layer of the cathode common electrode.

Figure 3:
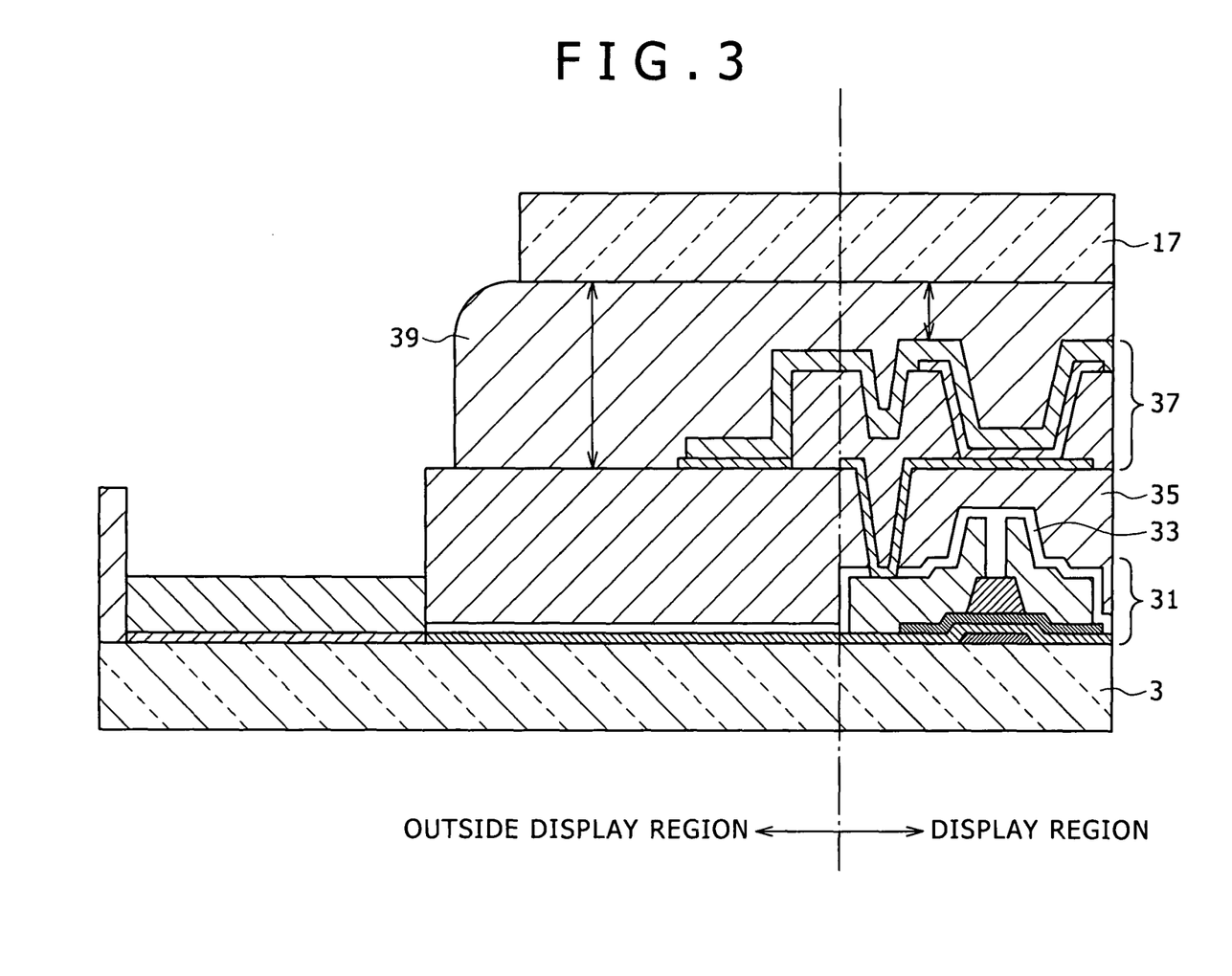
FIG. 3 is a partial cross sectional view of a portion in the proximity of the frame of the glass substrate shown in FIG. 2.

FIG. 3 shows a sectional configuration taken along line A-B of FIG. 2. Referring to FIG. 3, the sectional configuration of the organic EL panel module 1 is different between the inner side of the display region and the outer side of the display region.

For example, within the display region 5, a pixel circuit 31 formed from a thin film transistor and a holding capacitor is formed on the surface of the glass substrate 3, and a protective film 33 and a flattening film 35 are laminated as upper layers on the pixel circuit 31.

An organic EL thin film 37 formed from a metal anode electrode, an organic film and an organic cathode common electrode is laminated as an upper layer on the flattening film 35, and a sealing material 39 and the opposing glass plate 17 are laminated as upper layers on the organic EL thin film 37.

Meanwhile, in the outside region of the display region, that is, in a frame region of the glass substrate 3, the protective film 33, flattening film 35 and sealing material 39 are laminated in order on an upper face of the glass substrate 3.

SUMMARY OF THE INVENTION

Incidentally, the opposing glass plate 17 described above is secured to a predetermined position through a step of applying the sealing material 39 to the surface of a substrate layer formed adjacent the glass substrate 3, another step of applying pressure to the opposing glass plate 17 disposed on the surface of the sealing material 39 through a roller or the like and a further step of thermally hardening or photo-setting the sealing material 39 in this state.

However, in the case of the related art structure described above with reference to FIG. 3, the film thickness D2 of the sealing material 39 corresponding to the outside of the display region 5 is much greater than the film thickness D1 of the sealing material 39 corresponding to the display region 5.

However, where the sealing material 39 has a great film thickness, the possibility that a gap may appear at the sealing material 39 upon hardening is high. As a result, there is a problem that humidity is likely to invade through the gap.

Further, when pressure is applied to the opposing glass plate 17, at the outer edge portion of the sealing material 39 having the great film thickness, the sealing material 39 is likely to protrude from sidewardly of the opposing glass plate 17. If the protruding sealing material 39 thereupon remains as it is at a terminal portion, this makes a cause of faulty mounting of a TAB or an IC.

It is to be noted that, as one of countermeasures for preventing such situations, it seems a possible idea to use a material of the type which has high viscosity and hardens rapidly. However, since change of the material increases the production cost, it is not practical.

Meanwhile, as a countermeasure against faulty mounting, it seems a possible idea to provide terminal portions taking a margin for protrusion into account. However, the frame increases by the margin for protrusion and drops the theoretical yield. In other words, there is a problem that the panel cost rises.

A different method is disclosed in Japanese Patent Laid-Open No. 2006-324261. According to the method, a partition is provided adjacent the opposing glass plate 17. Therefore, the method has another problem that the cost increases.

According to the present invention, there is provided a display panel having a panel structure ready for an active matrix driving method, including an element having a formation face on which pixel circuits are formed, and an opposing substrate configured to seal the formation face, the opposing substrate having a protrusion pattern formed in a region thereof opposing to an outer edge of the opposing substrate, the protrusion pattern having a layer structure similar to that in a display region of the formation face.

With the display panel, the thicknesses of the sealing material at the outer edge portion of the opposing substrate and the display region, that is, the formation region of the pixel circuits, can be made equal to each other or uniformized. Consequently, the gap amount or the protrusion amount of the sealing material at the outer edge portion of the opposing substrate can be suppressed.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, the present invention is described in connection with an organic EL panel module of the active matrix driving type to which it is applied.

It is to be noted that, to technical matters which are not particularly described in the present specification or illustrated in the accompanying drawings, those technical matters which are well known in the applicable technical field or publicly known technical patters are applied.

A. First Embodiment

A-1. Configuration of the Organic EL Panel

Figure 4:
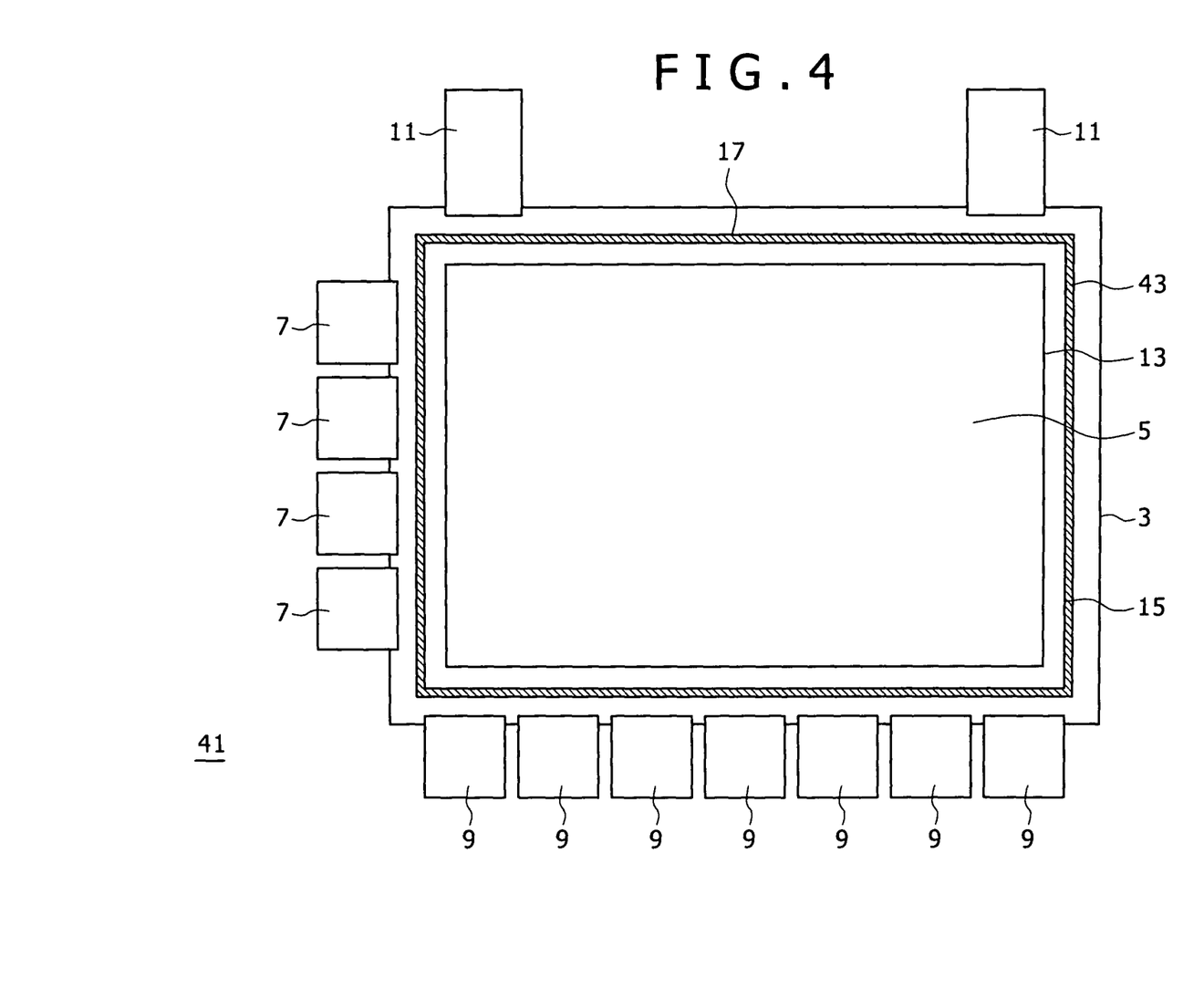
FIG. 4 is a schematic view showing an example of a configuration of an organic EL panel module to which the present invention is applied.

FIG. 4 shows an example of a configuration in plan of an organic EL panel module 41 according to a first embodiment of the present invention.

Those parts shown in FIG. 4 which are identical to those shown in FIG. 1 are denoted by identical reference numerals.

Referring to FIG. 4, the organic EL panel module 41 of the present embodiment has a basic configuration similar to that described hereinabove with reference to FIG. 1. However, the organic EL panel module 41 is different from the organic EL panel module 1 shown in FIG. 1 in that a rib region 43 for supporting the opposing glass plate 17 is disposed in a region of the glass substrate 3, on which pixel circuits from which a display region 5 is formed are formed, opposing to an outer edge portion of the opposing glass plate 17.

Figure 5:
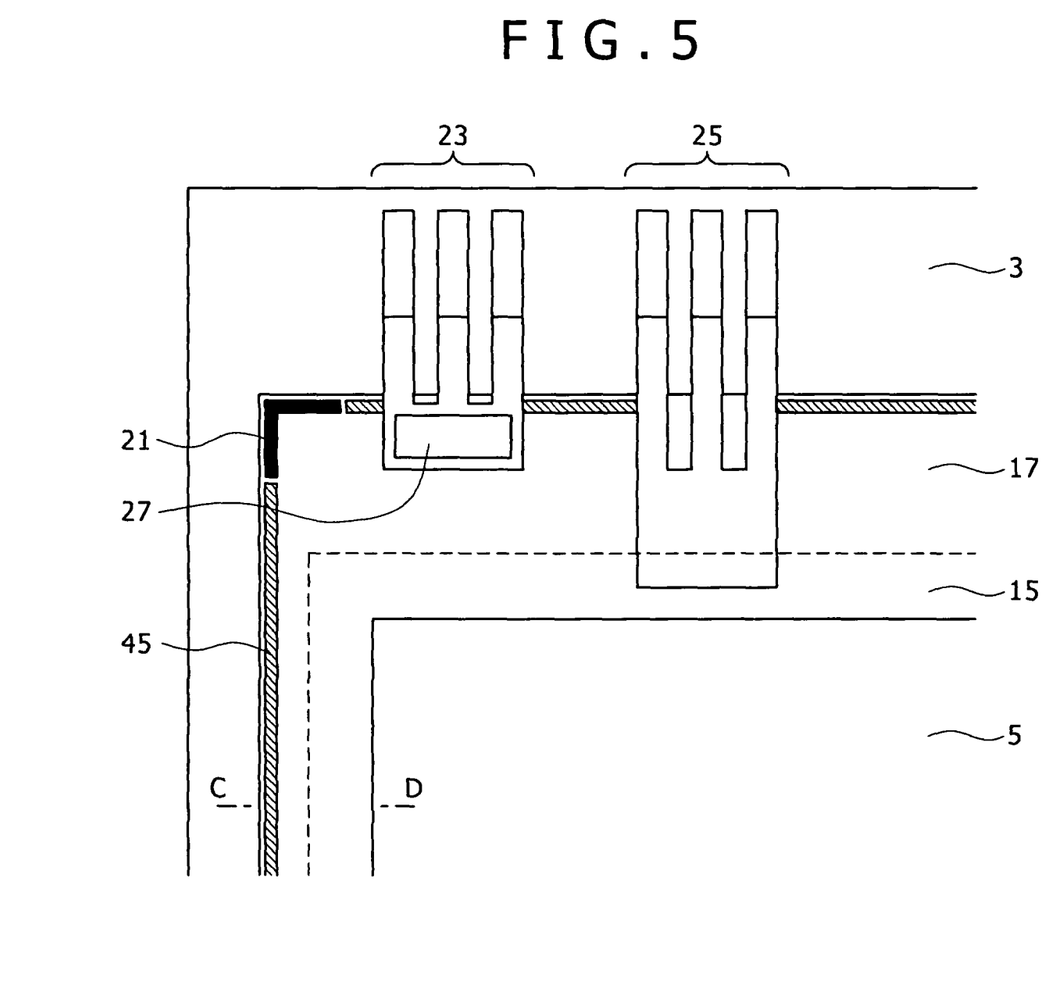
FIGS. 5, 6 and 7 are schematic views showing different examples of a protrusion pattern used in the organic EL panel module of FIG. 4.

FIG. 5 shows an enlarged plan view of a portion in the proximity of a frame of the glass substrate 3 of the organic EL panel module 41. Referring to FIG. 5, a protrusion pattern 45 is formed in such a manner as to extend along an outer peripheral edge of the opposing glass plate 17 except portions of the rib region 43 at which the rib region 43 crosses lead wiring lines.

It is to be noted that the protrusion pattern 45 shown in FIG. 5 is a continuous pattern which surrounds almost the entire periphery of the opposing glass plate 17 except portions thereof corresponding to the lead wiring lines. Further, the cross sectional structure of the protrusion pattern 45 is formed so as to be same as the cross sectional structure of the pixel circuits and the organic EL devices which form the display region 5.

Where the cross sectional structure of the protrusion pattern 45 is same as that of the pixel circuits and the organic EL devices, the structural strength of the protrusion pattern 45 can be equal to the structural strength of the inside of the display region 5.

Figure 6:
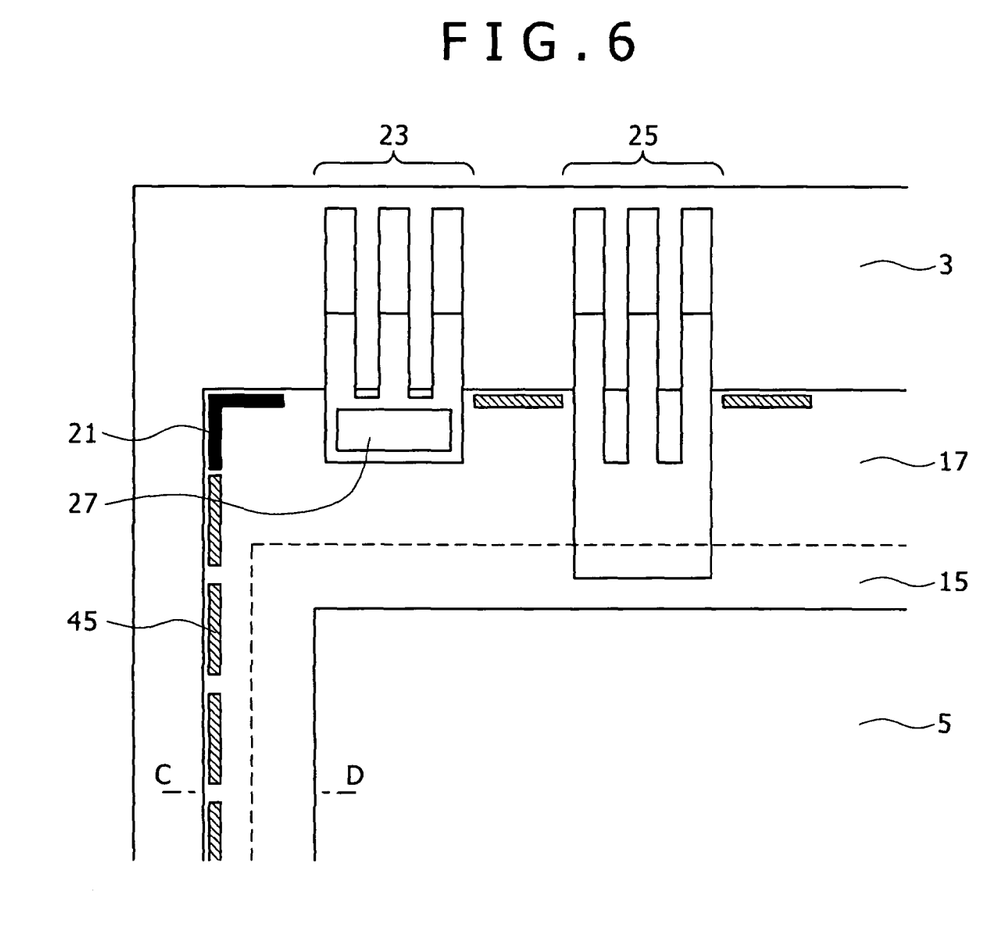
Figure 7:
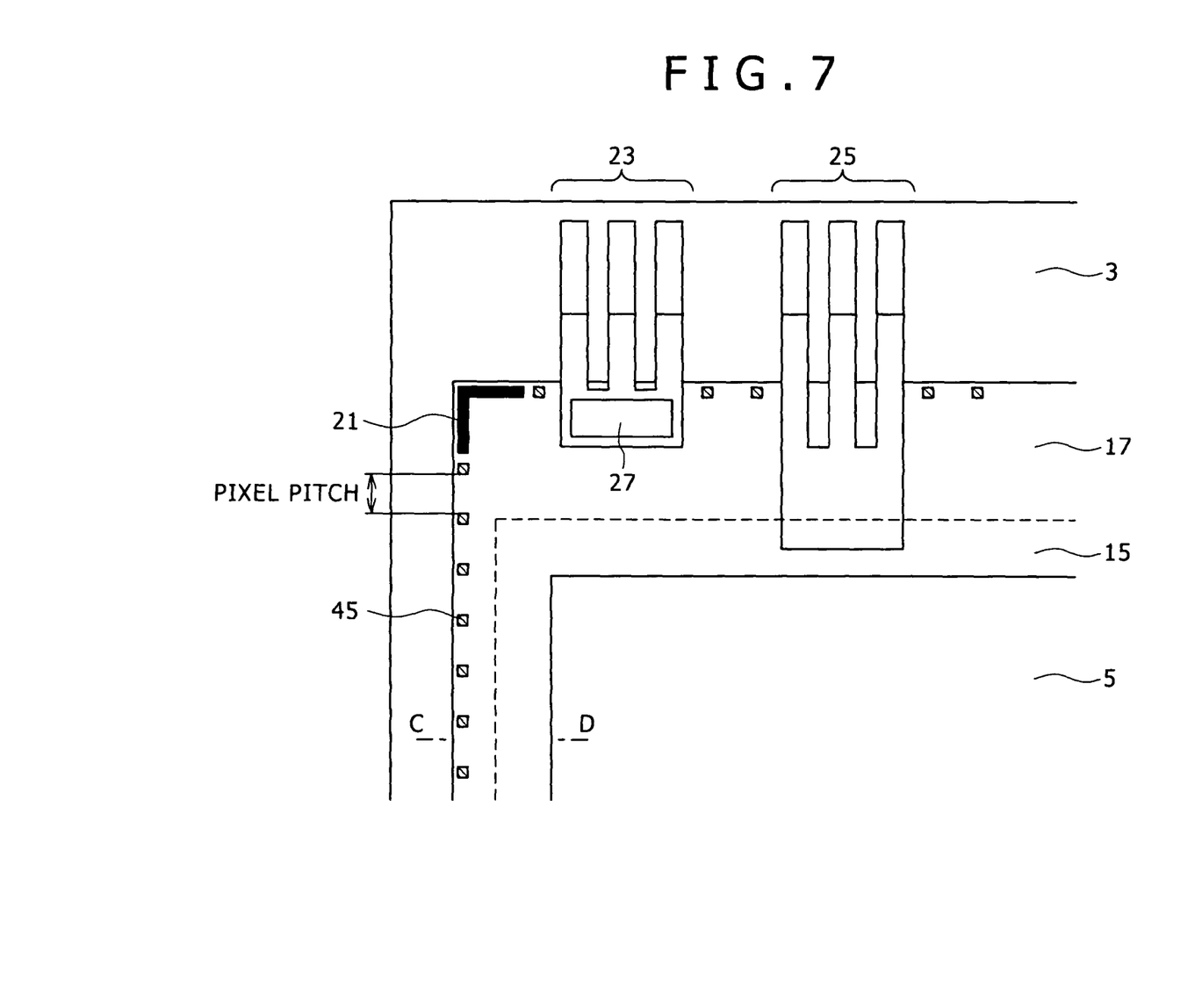

It is to be noted that the shape of the protrusion pattern 45 is shown such that it can be configured in an intermittent pattern as seen in FIG. 6 or 7. In the plan pattern shown in FIG. 6, the protrusion pattern 45 is formed like a broken line. Meanwhile, in the plan pattern shown in FIG. 7, the protrusion pattern 45 is formed like a pitch broken line of a pitch equal to the pixel pitch.

Figure 8:
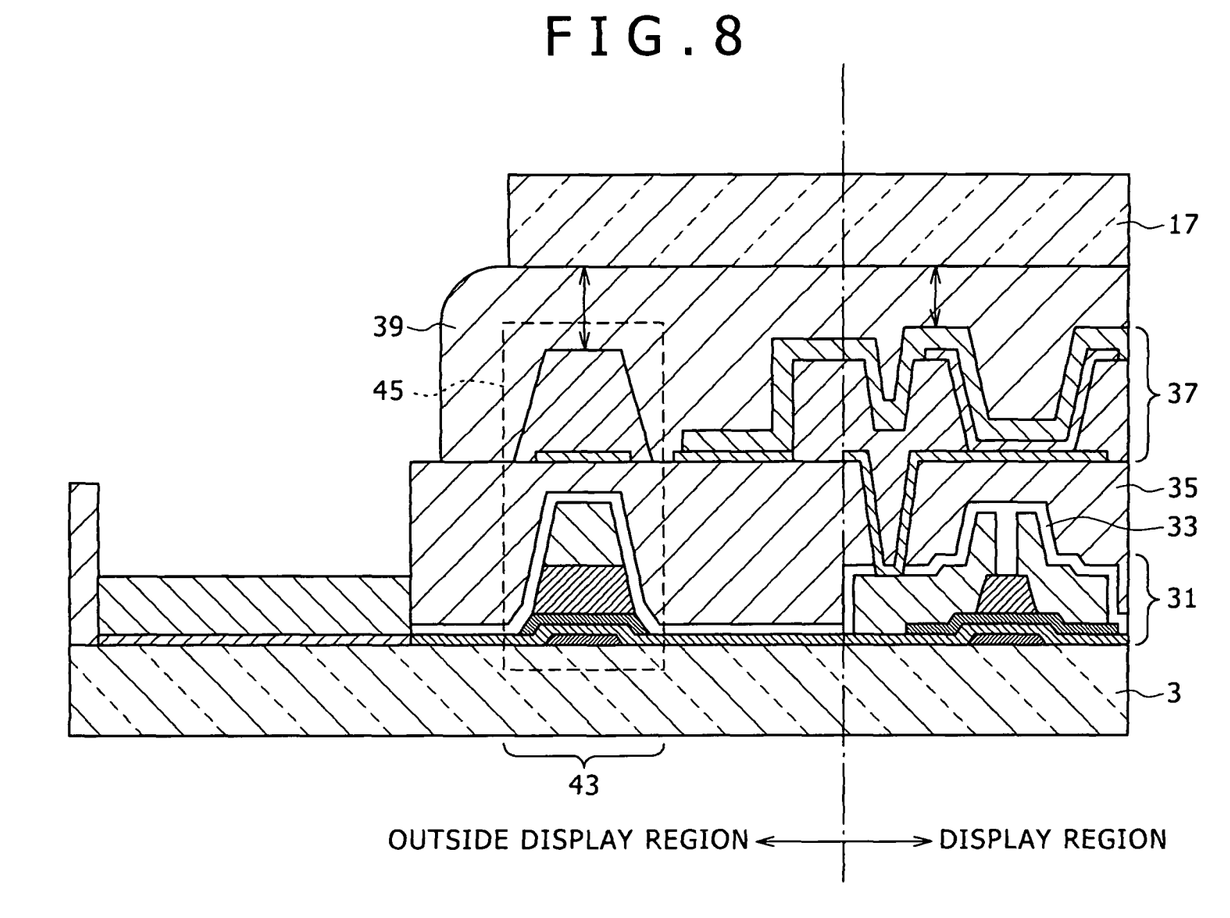
FIG. 8 is a partial sectional view of a portion in the proximity of a frame of a glass plate used in the organic EL panel module of FIG. 4.

FIG. 8 shows a sectional configuration taken along line C-D of FIGS. 5 to 7. Referring to FIG. 8, the sectional configuration of the organic EL panel module 41 is formed such that a pixel circuit formed inside the display region 5 and the protrusion pattern 45 formed outside the display region 5 have a same sectional shape.

Incidentally, in the region corresponding to the inside of the display region 5, the sectional configuration includes, in order from the surface side of the glass substrate 3, a pixel circuit 31 including a thin film layer, insulating and flattening films, a pixel electrode and so forth, the protective film 33, the flattening film 35, the organic EL thin film 37 including a metal anode electrode, an organic film, an organic cathode common electrode and so forth, the sealing material 39 and the opposing glass plate 17.

On the other hand, in the region corresponding to the rib region 43, the sectional configuration includes, in order from the surface side of the glass substrate 3, a pixel circuit 31 including a thin film layer, insulating and flattening films, a pixel electrode and so forth, the protective film 33, the flattening film 35, the organic EL thin film 37 including a metal anode electrode, an organic film, an organic cathode common electrode and so forth, the sealing material 39 and the opposing glass plate 17.

Since the display region 5 and the protrusion pattern 45 are formed in the same layer structure as seen in FIG. 8, the heights thereof are substantially equal to each other. Accordingly, the thicknesses of the sealing material 39 in the display region 5 and the rib region 43 are substantially equal to each other as indicated by double-sided arrow marks in FIG. 8.

Accordingly, when the glass substrate 3 is sealed with the opposing glass plate 17, pressure applied to a portion of the opposing glass plate 17 in the proximity of an outer edge upon sealing is dispersed to the pixel circuits in the display region 5 and the protrusion pattern 45 in the rib region 43.

Particularly, even where dust is deposited in the proximity of the outer edge of the opposing glass plate 17, the dispersion effect of the pressure can prevent excessively high pressure from being applied to the pixel circuits in the proximity of the outer edge of the opposing glass plate 17. As a result, the possibility that the wiring lines of the pixel circuits may be crushed by excessively high pressure can be reduced. In other words, the probability of occurrence of disconnection fault can be reduced.

Further, since the film thickness of the sealing material 39 is uniformized over the overall area, the possibility that a gap may appear at an outer peripheral portion of the sealing material 39 can be suppressed. Further, since the protrusion pattern 45 is formed in such a manner as to surround the outer edge portion of the opposing glass plate 17, protrusion of the sealing material 39 from the end portion of the opposing glass plate 17 can be suppressed efficiently. As a result, occurrence of mounting fault caused by protrusion of the sealing material 39 can be suppressed efficiently.

B. Other Embodiments

B-1. Form of the Panel

In the embodiment described above, the device form wherein the surface of the display region 5 is sealed with the opposing glass plate 17 is the display panel module.

However, the present invention can be applied also to a device form at a stage before the surface of the display region 5 is sealed with the opposing glass plate 17 and the sealing material 39.

In the present specification, the device form before sealing is referred to as display panel. Incidentally, driving circuits for pixel circuits including a driving circuit for pixel control lines and a driving circuit for image signal lines may be formed on the display panel together with the pixel circuits or may be prepared separately as an IC device. Accordingly, depending upon the fabrication process, the driving circuits may be formed on the same substrate as that of the display region on the display panel.

It is to be noted that, in the foregoing description, both of the substrate on which the pixel circuits are formed and the counter substrate are formed from glass.

However, one or both of the substrates may be made of a plastic material, or formed from a film or some other material.

B-2. Electronic Apparatus

The organic EL panel module 41 described hereinabove is distributed also in the form of a commodity wherein it is incorporated in various electronic apparatus. In the following, various examples wherein the organic EL panel module 41 is incorporated in various electronic apparatus are described.

Figure 9:
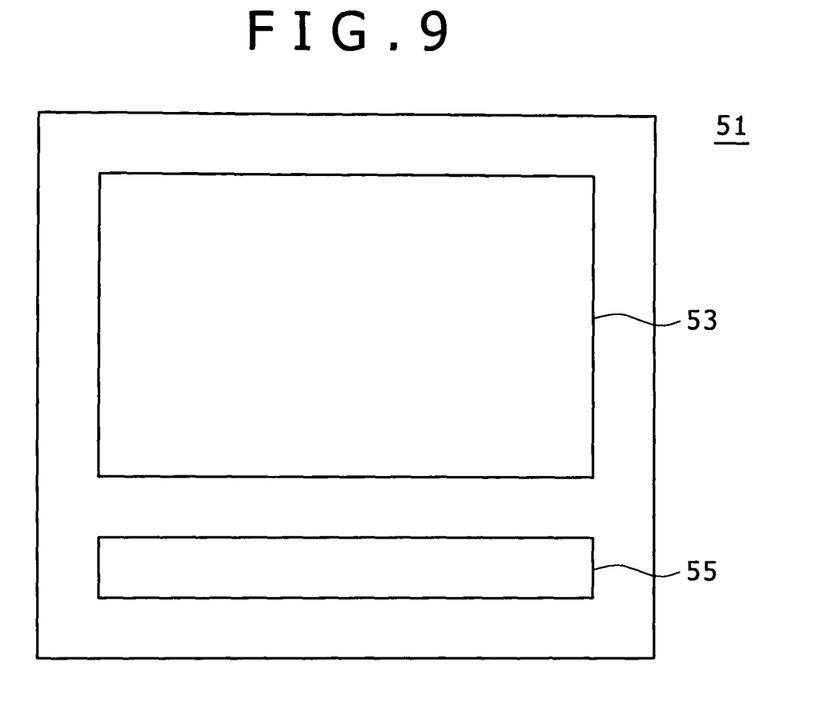
FIG. 9 is a view showing an example of a functional configuration of an electronic apparatus to which the organic EL panel module of FIG. 4 is applied.

FIG. 9 shows an example of a system configuration of an electronic apparatus. Referring to FIG. 9, the electronic apparatus 51 shown includes a display panel module 53 having the panel structure described above, and a system control section 55. The system control section 55 is a processing unit for controlling the entire system of the electronic apparatus and is formed, for example, from a CPU. The electronic apparatus 51 further includes an interface suitable for an application of the electronic apparatus 51.

Figure 10:
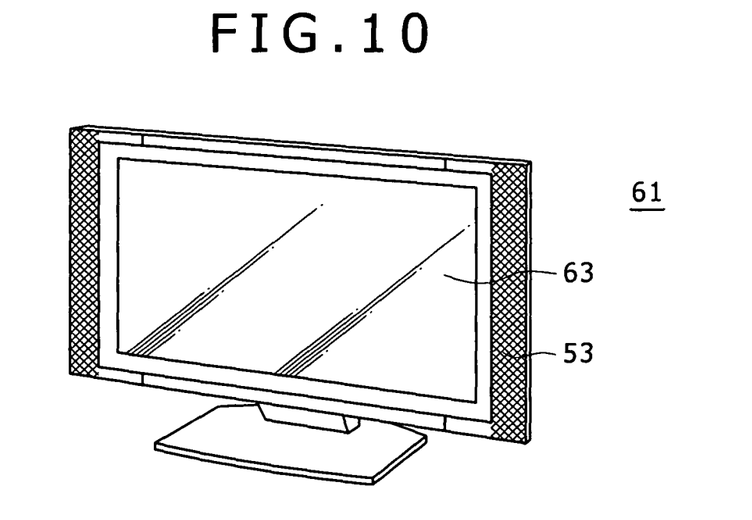
FIG. 10 is a perspective view of a television receiver as an example of the electronic apparatus of FIG. 9.

FIG. 10 shows an example of an appearance where the electronic apparatus is a television receiver. Referring to FIG. 10, the television receiver 61 shown is structured such that the display panel module 53 is disposed in front of a front panel 63.

Figure 11A:
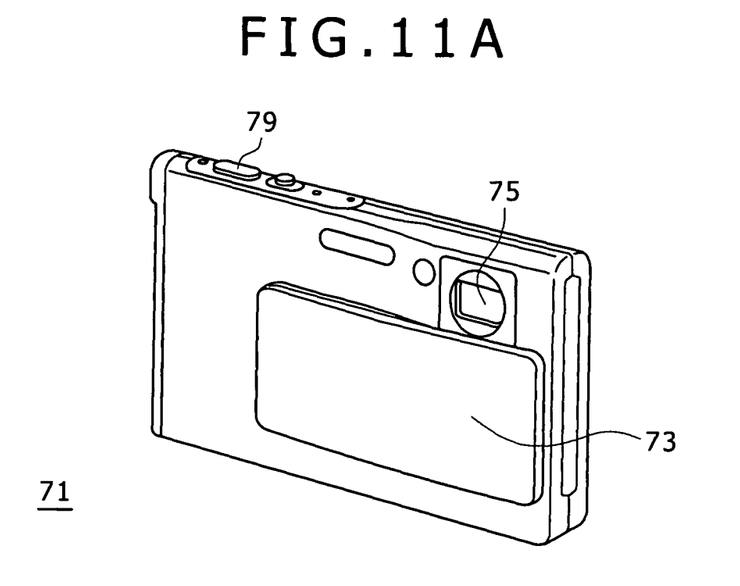
FIGS. 11A and 11B are perspective views of a digital camera as another example of the electronic apparatus of FIG. 9.
Figure 11B:
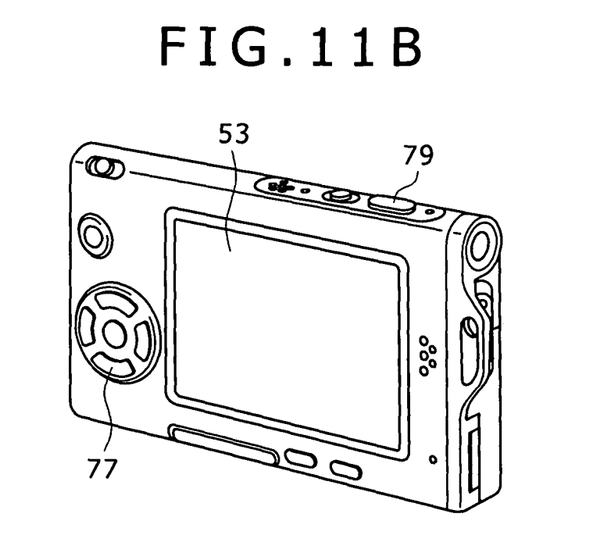

FIGS. 11A and 11B show an example of an appearance where the electronic apparatus is a digital camera. Particularly, FIG. 11A shows an appearance of the front side, that is, the image pickup object side, of the digital camera, and FIG. 11B shows an appearance of the rear side, that is, the image pickup person side, of the digital camera.

Referring to FIGS. 11A and 11B, the digital camera 71 shown includes a protective cover 73, an image pickup lens section 75, the display panel module 53, a control switch 77, a shutter button 79 and so forth.

Figure 12:
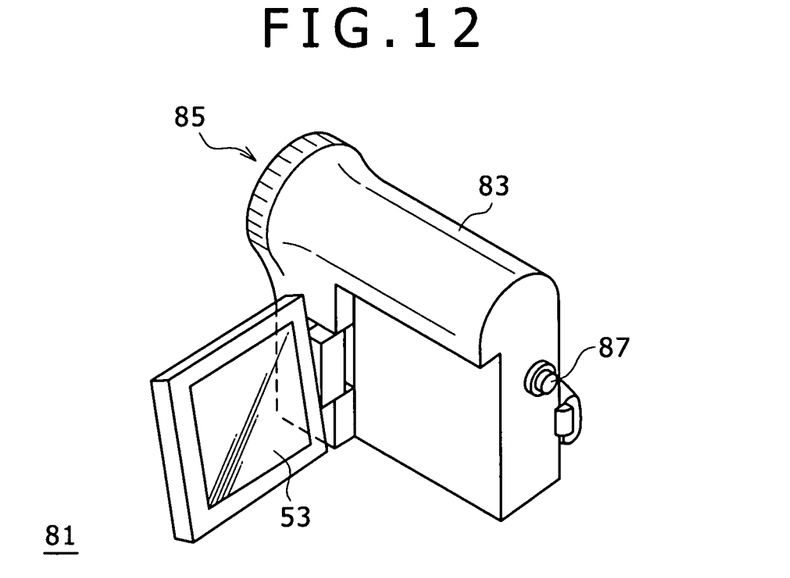
FIG. 12 is a perspective view of a video camera as a further example of the electronic apparatus of FIG. 9.

FIG. 12 shows an example of an appearance where the electronic apparatus is a video camera. Referring to FIG. 12, the video camera 81 shown includes an image pickup lens 85 for picking up an image of an image pickup object, an start/stop switch 87 and the display panel module 53, all disposed on the front thereof.

Figure 13A:
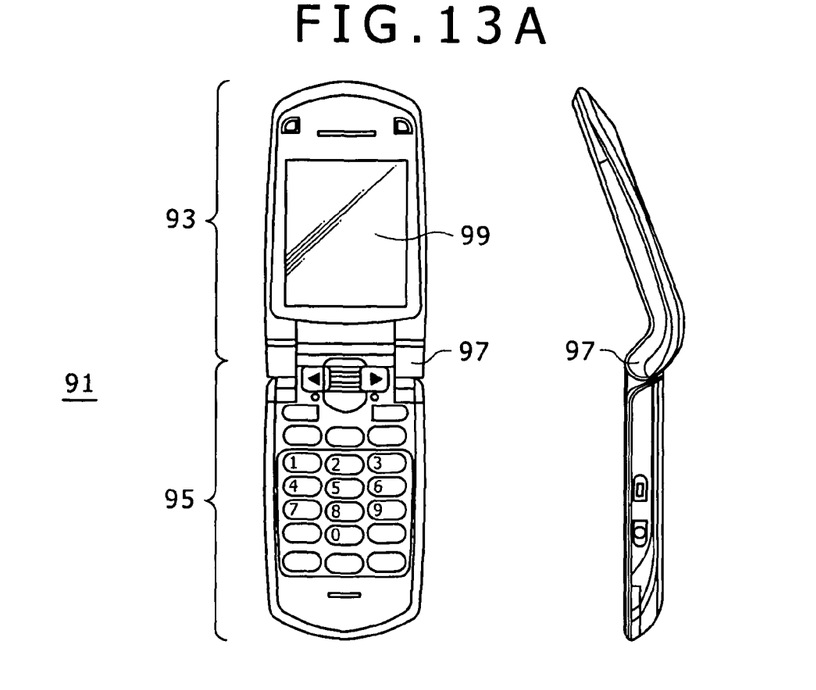
FIGS. 13A and 13B are views of a portable telephone set a still further example of the electronic apparatus of FIG. 9.
Figure 13B:
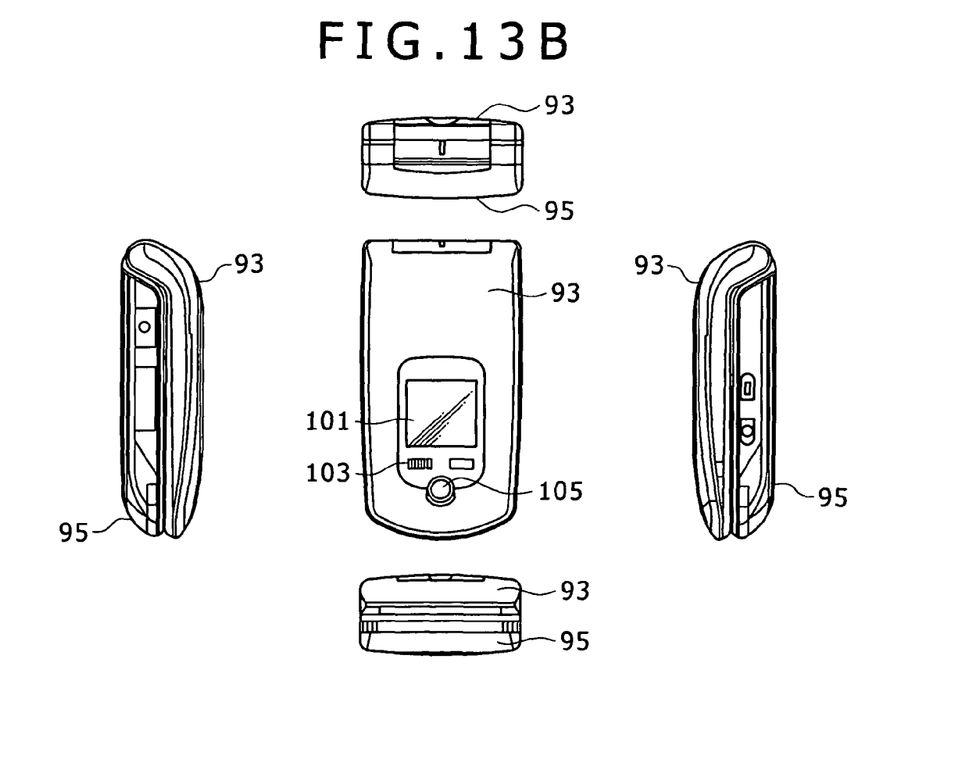

FIGS. 13A and 13B show an example of an appearance where the electronic apparatus is a portable telephone set. The portable telephone set 91 shown in FIGS. 13A and 13B is of the foldable type, and FIG. 13A shows an example of an appearance of the portable telephone set 91 in a state wherein a housing is unfolded while FIG. 13B shows an example of an appearance of the portable telephone set 91 in a state wherein the housing is folded.

Referring to FIGS. 13A and 13B, the portable telephone set 91 shown includes an upper side housing 93, a lower side housing 95, a connection portion 97 in the form of a hinge, a main display panel module 99, a sub display panel module 101, a picture light 103 and an image pickup lens 105. It is to be noted that the main display panel module 99 and the sub display panel module 101 correspond to the display panel module 53.

Figure 14:
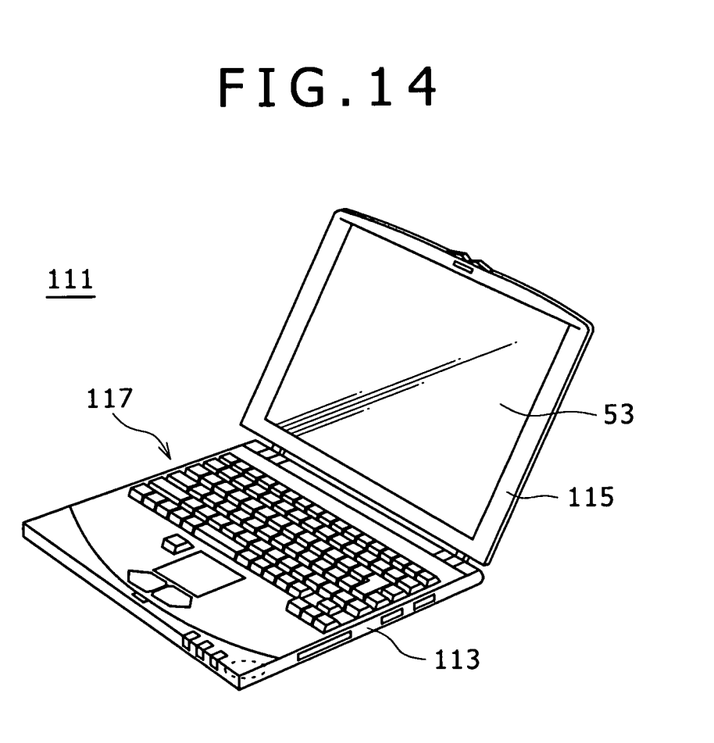
FIG. 14 is a perspective view of a computer as a yet further example of the electronic apparatus of FIG. 9.

FIG. 14 shows an example of an appearance where the electronic apparatus is a computer. Referring to FIG. 14, the computer 111 includes a lower side housing 113, an upper side housing 115, a keyboard 117 and the display panel module 53.

In addition, the display panel module 53 can be incorporated also in an audio reproduction apparatus, a game machine, an electronic book, an electronic dictionary and various other electronic apparatus.

B-3. Other Display Devices

In the embodiment described above, the display panel module is an organic EL panel module.

However, the panel structure described above can be applied not only to an electronic EL panel module, but also to any other self-luminous display panel and a non-self-luminous type display panel module such as a liquid crystal panel module.

B-4. Others

Various modulations to the embodiment described above can be made within the subject matter of the present invention. For example, various modifications or applications may be made by creation or combination based on the disclosure of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An organic electroluminescence display panel having a display region and an outside region in contact with and surrounding the display region, the organic electroluminescence display panel comprising:

a glass substrate extending in the display region and the outside region and having a flat glass substrate surface;

a pixel circuit located in the display region and disposed on and projecting away from the flat glass substrate surface to terminate at a pixel circuit height, the pixel circuit fabricated from at least four different pixel circuit materials;

a first protrusion located in the outside region, juxtaposed the pixel circuit and disposed on and projecting away from the flat glass substrate at approximately the pixel circuit height, the first protrusion fabricated from the at least four different pixel circuit materials and configured differently than the pixel circuit as viewed in cross-section;

a single-compound flattening film contacting and at least substantially covering the pixel circuit and contacting and completely covering the first protrusion, the flattening film terminating in a flat flattening film surface disposed above the pixel circuit and the first protrusion;

an organic EL thin film located in the display region and disposed on and projecting, in part, into the flattening film at a projection distance sufficient to contact the pixel circuit and projecting, in part, away from the flat flattening film surface to terminate at an organic EL thin film height, the organic EL thin film fabricated from at least two organic EL thin film materials;

a second protrusion located in the outside region, juxtaposed and electrically insulated from the organic EL thin film and disposed on and projecting away from the flat flattening film surface at approximately the organic EL thin film height, the second protrusion fabricated from the at least two organic EL thin film materials and configured differently than the organic EL thin film as viewed in cross-section;

a single-compound, thermally-hardened or photo-set sealing material contacting and covering the organic EL thin film circuit and the second protrusion and terminating in a flat sealing material surface disposed above the organic EL thin film circuit and the second protrusion; and a glass plate disposed on the flat sealing material surface and over the organic EL thin film circuit and the second protrusion, wherein the first and second protrusions have similar shapes as viewed in cross-section and the second protrusion is stacked on top of the first protrusion and is separated therefrom by the flattening film.

2. The organic electroluminescence display panel according to claim 1, wherein the pixel circuit projects away from the flat glass substrate surface at a pixel circuit distance and the first protrusion projects away from the flat glass substrate at a first protrusion distance being at least substantially equal to the pixel circuit distance.

3. The organic electroluminescence display panel according to claim 2, wherein the organic EL thin film projects away from the flat flattening film surface at an organic EL thin film distance and the second protrusion projects away from the flat flattening film surface at a second protrusion distance being at least substantially equal to the organic EL thin film distance.

4. The organic electroluminescence display panel according to claim 1, wherein the organic EL thin film projects away from the flat flattening film surface at an organic EL thin film distance and the second protrusion projects away from the flat flattening film surface at a second protrusion distance being at least substantially equal to the organic EL thin film distance.

5. The organic electroluminescence display panel according to claim 1, wherein a sealing material contacts the flat flattening film surface at least in the outside region.

6. An electronic apparatus, comprising:

the organic electroluminescence display panel according to claim 1;

a system control section configured to control operation of an entirety of the electronic apparatus; and an operation inputting section configured to accept an operation input to said system control section.

7. The organic electroluminescence display panel according to claim 1, wherein, relative to the glass substrate as viewed in cross-section being at a bottom-most position, the organic EL thin film is disposed and aligned above the pixel circuit within the display region and the second protrusion is disposed and aligned above the first protrusion within the outside region.

* * * * *